UNITED STATES PATENT OFFICE.

W. E. WOODBRIDGE, OF LITTLE FALLS, NEW YORK.

IMPROVEMENT IN SEPARATING VEGETABLE FIBERS.

Specification forming part of Letters Patent No. 39,981, dated September 15, 1863; antedated June 24, 1863.

*To all whom it may concern:*

Be it known that I, W. E. WOODBRIDGE, of the village of Little Falls, in the county of Herkimer, in the State of New York, have invented a new and improved process for separating woody and other vegetable fibers and preparing them for the manufacture of paper and other similar uses; and I do hereby declare the following to be a full and exact description thereof.

The nature of my invention consists in the method of treating with alkaline solutions the fibrous material subjected to the process, the removal of the alkali from the fiber, and the subsequent recovery and preparation of the same for renewed use.

To enable others skilled in the art to use my invention, I will proceed to describe the process I prefer for the treatment of wood, and afterward to point out modifications, which may be used as circumstances may require.

The wood to be operated on is first to be reduced to chips or other pieces of such size as to be readily penetrated by the alkaline liquor which is to be applied to them. The liquor which I prefer is a solution of caustic soda of the specific gravity of about 1.28 or 1.3. The wood may be soaked in this liquor and afterward drained; but it is more expeditious and better to put the chips into a revolving drum prepared for the purpose, which should be mounted on a horizontal tubular shaft, through which the alkaline liquor should be supplied to the interior. The amount required for ordinary non-resinous wood—as, for example, spruce—which has been moderately seasoned will be about as much as the chips will retain without dripping. The process of saturation may be aided by an elevation of temperature. When the wood has been properly impregnated with the liquor, which must contain a sufficient quantity of alkali to decompose or disintegrate that portion of the wood which it is desired to remove, so as to release the fibers, it is to be subjected to a temperature of about 300° Fahrenheit, free from any considerable increase of pressure above that of the atmosphere, in order that the liquid may become concentrated within the pores of the wood by the evaporation of the water, and its action thereby promoted.

The method which I prefer for heating the saturated or impregnated wood is by inclosing it in a revolving drum, (which must not be steam-tight, and may be the same in which the impregnation is effected,) which drum is itself inclosed in a stationary casing constructed of some slow conductor of heat, and the interior of which is heated by steam pipes or flues. The thorough interchange of position caused by the motion of the drum between the portions of its contents secures great uniformity of temperature.

The difficulty of making direct observations on the temperature of the mass contained in the rotating drum calls for the adoption of an indirect method. Perhaps the best is to inclose within the drum, where it will come in contact with the wood in process, a small and strong boiler, which must contain water and be connected by a tube passing out of the drum through its shaft and provided with a suitable joint, allowing the communication to be kept up during rotation with a pressure-gage. The pressure of the steam generated within the boiler so inclosed will of course increase with the temperature, and the indications of pressure will also serve to give indication of the temperature of the boiler, which must be nearly that of the material with which it comes in contact. A pressure of fifty-two pounds per square inch above that of the atmosphere corresponds nearly with the temperature of 300°. The correspondence between the indicated pressure and the temperature required may be determined for any particular apparatus from an examination of the fibers of the wood with which the drum is charged. If they are found to separate with difficulty after soaking in water, the heat has not been sufficient. If they separate freely but their strength is injured, the temperature has been too high. If they separate freely and their strength is not injured, the proper temperature has been attained.

The wood, after having been treated as above described and cooled, will be found quite dry. It consists of fibers and a soluble portion, which as yet holds them together, and which it is the object of the next step of the process to remove. This may be done by merely washing in water. It is, however, necessary, in an economic point of view, to preserve the alkali it contains, and the prepared wood is treated with as small a quantity of water as will suffice to properly dissolve the soluble parts, and subjected to pressure in order to squeeze out as much of the liquid as conveniently possible. The fibers may be watered and pressed as many times as the value of the alkali obtained will warrant, and the weak liquors obtained may be used for the removal of the first portions of the soluble matter from another quantity of prepared wood.

After the treatment above described the fibers are to be well washed in an ordinary washing-engine, or otherwise, during which operation they will commonly be nearly or quite sufficiently separated for immediate use in the manufacture of paper. If any further division is needed, it may be effected by any of the known mechanical means. Their subsequent treatment does not form a part of this invention.

The liquid expressed from the fiber and containing the alkali, in combination with a portion of the wood is to be evaporated to dryness, and the residuum incinerated by means of any known apparatus adapted to the purpose. By this means the alkali is reduced chiefly or wholly to the condition of a carbonate mixed with carbon. If the incineration has been properly conducted, the carbon will not exceed, at most, fifty per cent. The ash is to be mixed with water and quicklime in the quantities required to render the alkali caustic, and the solution brought to the proper degree of strength for subsequent use, if necessary, by evaporation, as is already practiced in the arts.

It is evident that inasmuch as the proportions of fiber in different vegetable productions—as, for instance, in the different parts of the same tree, the wood, leaves, and bark—will be found to vary in their relations to resinous, gummy, or cellular portions to be removed, the quantity of alkali must be varied accordingly. It is no part of my invention to assign for each individual material the proportions required, which must be learned by trial or preliminary examination.

I do not propose to confine myself to soda as the alkali to be used, but to substitute for it, when desirable, an equivalent quantity of potash, or of a mixture of potash and soda.

It is not essential that the alkali should be pure; but the presence of foreign salts will be likely to affect the density of solution of the same alkaline strength, which last is the more important point. So, too, the impurities may affect the temperature required for the proper action of the alkali without rendering it wholly unfit for use.

As to the strength of the solution used, it is essential only that the quantity of water in the solution should be sufficient to distribute the alkali with uniformity throughout all parts of the material to be acted on, and that the quantity of alkali is sufficient to remove that portion of the material which binds together the fibers.

It is essential to due economy that the quantity of alkali used should not be much greater than is required for the purpose just mentioned; and it is undesirable that the quantity of water in the solution should be greater than is required for the thorough inpregnation of the material, as the consumption of heat and losses of materials attending the process will be thereby increased.

The principal feature of my invention consists, as will have been perceived, in applying the alkali requisite for separating the fibers of the material acted on in such condition of solution that it may be wholly absorbed within the pores of that material, and subjecting the material so impregnated to a desiccative heat, thereby concentrating the absorbed solution and promoting the action designed. This mode of treatment, in addition to the perfection with which it separates the fibers, permits the employment of the least quantity of alkali which is chemically sufficient for the work and admits of obtaining the combined or contaminated alkali after the submission of the material to heat in most concentrated form for recovery by the subsequent procedure.

I propose to vary the management of the process in any way that does not affect the principle, and suggest the following modifications, which may be more or less desirable, according to circumstances.

I propose to use the alkaline solution weaker than will contain a sufficient quantity of alkali to cause the separation of the fibers in the volume that can be absorbed by the wood or other material, either supplying the increased volume required during the course of desiccation or supplying it at once and allowing it to become reduced to the volume which may be absorbed in the presence of the fibrous material.

I propose to cause a circulation of the air and vapor which may be included within the casing of the rotating drum before mentioned through openings about the axis of the drum, for the purpose of accelerating the conveyance of heat to its contents.

I propose to use, as a means of procuring an indication of the temperature of the contents of the drum, a mercurial thermometer having a stem of sufficient length to protrude from the hollow shaft far enough for observation, while the bulb is well within the drum. I prefer that the thermometer should not rotate, and that the protruding part of the stem should be bent upward, to insure the prevention of any vacuity in that part of the instrument which should be filled with mercury.

I propose to surround the drum or tumbler with steam pipes or passages revolving with it for supplying the heat, which pipes or passages are to be kept in communication during the process with a supply of steam of suitable temperature, or to provide the tumbler with such pipes passing through its interior.

I propose to make use of any known method of heating such materials uniformly to the required temperature under the ordinary pressure (or nearly so) of the atmosphere.

I also propose to remove the soluble portions of the prepared wood by the ordinary process of leaching, or by any mode of washing which may be applicable.

What I claim as my invention, and desire to secure by Letters Patent, is—

1. The application of the quantity of alkali requisite for separating the fibers of the material acted on in such condition or strength of solution that it may be wholly absorbed within the pores of that material, and subjecting the material so impregnated to a desiccative heat, thereby concentrating the absorbed solution and promoting the action designed, the quantity of alkali, and the precise temperature to be regulated by the nature and quality of the materials employed, as set forth in this specification.

2. The method of impregnating the material by inclosing it in a revolving vessel, to which the solution is gradually supplied, substantially as described.

3. The subjection of the material thus impregnated to desiccative heat in the same vessel in which the impregnation is effected.

4. In connection with the process described, the recovery of the alkali contained in the soluble portions of the prepared material for renewed use by removing them with as small a quantity of water as is usefully practicable, and by evaporation and incineration.

W. E. WOODBRIDGE.

Witnesses:
  D. ROWLAND,
  WM. M. IRWIN.